(12) United States Patent
Bailey et al.

(10) Patent No.: US 7,913,675 B2
(45) Date of Patent: Mar. 29, 2011

(54) GASEOUS FUEL ENGINE CHARGE DENSITY CONTROL SYSTEM

(75) Inventors: Brett M. Bailey, Peoria, IL (US); William C. Boley, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 202 days.

(21) Appl. No.: 12/291,796

(22) Filed: Nov. 13, 2008

(65) Prior Publication Data
US 2009/0076713 A1    Mar. 19, 2009

Related U.S. Application Data

(63) Continuation-in-part of application No. 11/245,374, filed on Oct. 6, 2005, now abandoned.

(51) Int. Cl.
*F02M 33/04* (2006.01)
*F02M 33/02* (2006.01)

(52) U.S. Cl. .................................. 123/568.21

(58) Field of Classification Search ............ 123/568.11, 123/568.21, 568.12; 701/108, 109; 60/605.1, 60/605.2
See application file for complete search history.

(56) References Cited

U.S. PATENT DOCUMENTS

| | | | |
|---|---|---|---|
| 4,173,205 A | 11/1979 | Toelle | |
| 4,240,395 A * | 12/1980 | Simko et al. | 123/445 |
| 4,404,946 A * | 9/1983 | Hoard et al. | 123/486 |
| 4,553,518 A | 11/1985 | Takao et al. | |
| 5,029,570 A | 7/1991 | Stoltman et al. | |
| 5,131,224 A | 7/1992 | Siewert et al. | |
| 5,448,887 A | 9/1995 | Takeshima | |
| 5,520,161 A | 5/1996 | Klopp | |
| 5,529,048 A | 6/1996 | Kurihara et al. | |
| 5,551,411 A | 9/1996 | Ward | |
| 5,553,575 A | 9/1996 | Beck et al. | |
| 5,588,416 A | 12/1996 | Suzuki et al. | |
| 5,720,266 A * | 2/1998 | Nogi et al. | 123/680 |
| 5,802,846 A | 9/1998 | Bailey | |
| 5,921,224 A | 7/1999 | Sinnamon | |
| 5,996,337 A | 12/1999 | Blosser et al. | |

(Continued)

FOREIGN PATENT DOCUMENTS
EP    1028243 A2    8/2000
(Continued)

OTHER PUBLICATIONS

PCT International Search Report, PCT/US2006/032853, Filing Date: Aug. 22, 2006; Applicant: Caterpillar Inc., Date of Mailing: Jan. 17, 2007.

*Primary Examiner* — Mahmoud Gimie
(74) *Attorney, Agent, or Firm* — Liell & McNeil

(57) ABSTRACT

A spark ignited gaseous fuel engine including an exhaust gas recirculation system and method for operating a gaseous fuel engine are provided. The exhaust gas recirculation system has an adjustable flow and is operable to supply exhaust gas to at least one engine cylinder. The engine further includes means for determining a value indicative of a charge density of a combustion mixture that includes gaseous fuel, air and exhaust gas supplied to the at least one cylinder, and adjusting a flow quantity through the exhaust gas recirculation system based at least in part on the value. The charge density may permit the controller to set a $NO_x$ output rate from the engine via a pre-determined correlation between charge density and NOx output.

17 Claims, 2 Drawing Sheets

U.S. PATENT DOCUMENTS

| | | |
|---|---|---|
| 6,003,315 A | 12/1999 | Bailey |
| 6,035,639 A | 3/2000 | Kolmanovsky et al. |
| 6,038,860 A | 3/2000 | Bailey |
| 6,067,973 A | 5/2000 | Chanda et al. |
| 6,098,602 A | 8/2000 | Martin et al. |
| 6,112,729 A | 9/2000 | Barnes et al. |
| 6,209,530 B1 | 4/2001 | Faletti et al. |
| 6,216,458 B1 | 4/2001 | Alger et al. |
| 6,273,076 B1 | 8/2001 | Beck et al. |
| 6,289,884 B1 | 9/2001 | Blandino et al. |
| 6,311,679 B1 | 11/2001 | Druzhinina et al. |
| 6,401,700 B2 | 6/2002 | Balekai et al. |
| 6,422,003 B1 | 7/2002 | Ament et al. |
| 6,422,220 B1 | 7/2002 | Lepp et al. |
| 6,427,671 B1 | 8/2002 | Holze et al. |
| 6,453,893 B1 | 9/2002 | Coleman et al. |
| 6,463,907 B1 | 10/2002 | Hiltner |
| 6,474,323 B1 | 11/2002 | Beck et al. |
| 6,505,465 B2 | 1/2003 | Kanazawa et al. |
| 6,568,173 B1 | 5/2003 | Kolmanovsky et al. |
| 6,681,564 B2 | 1/2004 | Nishiyama et al. |
| 6,687,597 B2 | 2/2004 | Sulatisky et al. |
| 6,698,185 B2 | 3/2004 | Kitahara |
| 6,705,077 B2 | 3/2004 | Uedahira et al. |
| 6,705,301 B2 | 3/2004 | Dollmeyer et al. |
| 6,715,476 B2 | 4/2004 | Gopp et al. |
| 6,728,625 B2 | 4/2004 | Strubhar et al. |
| 6,782,696 B2 | 8/2004 | Shigahara et al. |
| 6,820,600 B1 | 11/2004 | Sisken et al. |
| 6,854,438 B2 * | 2/2005 | Hilger et al. .......... 123/260 |
| 6,948,475 B1 | 9/2005 | Wong et al. |
| 7,080,506 B2 | 7/2006 | Fukuzumi et al. |
| 7,267,117 B2 | 9/2007 | Tonetti et al. |
| 2002/0195086 A1 | 12/2002 | Beck et al. |
| 2004/0011323 A1 | 1/2004 | Hilger et al. |
| 2004/0024518 A1 | 2/2004 | Boley et al. |
| 2004/0064242 A1 | 4/2004 | Strubhar et al. |
| 2004/0069267 A1 | 4/2004 | Hilger et al. |
| 2007/0079598 A1 | 4/2007 | Bailey et al. |

FOREIGN PATENT DOCUMENTS

| | | |
|---|---|---|
| JP | 10318005 | 12/1998 |
| JP | 2002221037 | 8/2002 |
| JP | 2003269201 | 9/2003 |
| WO | WO 2004/031557 A1 | 4/2004 |
| WO | WO 2004/044406 | 5/2004 |

* cited by examiner

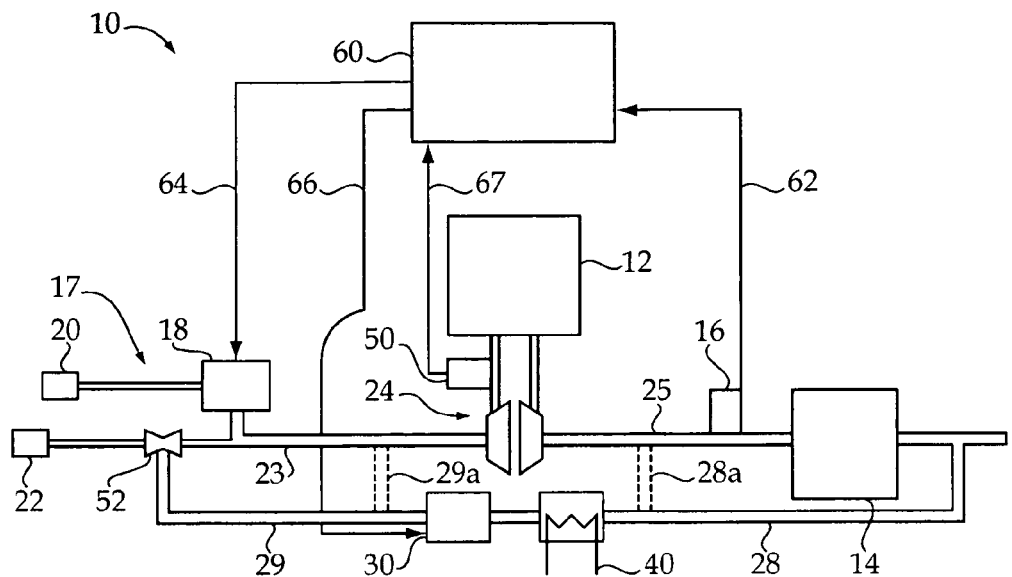
Figure 1
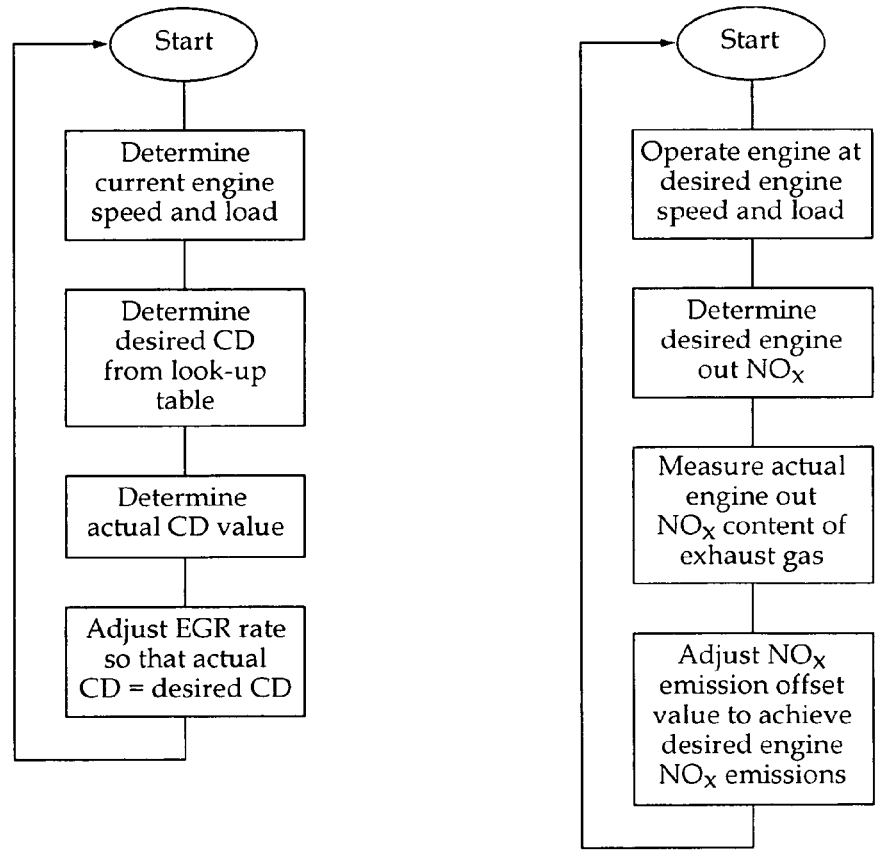
Figure 2
Figure 3

GASEOUS FUEL ENGINE CHARGE DENSITY CONTROL SYSTEM

RELATION TO OTHER PATENT APPLICATION

This application is a continuation in part of application Ser. No. 11/245,374, filed Oct. 6, 2005 now abandoned with the same title.

TECHNICAL FIELD

The present disclosure relates generally to gaseous fuel internal combustion engines, and relates more particularly to such an engine having exhaust gas recirculation to adjust a density of a gas mixture supplied to the engine.

BACKGROUND

Gaseous fuel internal combustion engines have long been known, and are increasingly commonplace in today's society. A typical gaseous fuel internal combustion engine differs from a traditional, liquid fuel internal combustion engine primarily in that a gas, such as methane, natural gas, ethane, propane, etc., or some mixture, is burned in the engine rather than an atomized mist of liquid fuel from a fuel injector or carburetor. Most gaseous fuel engines are spark ignited by a conventional J-gap spark plug. Other variations such as a non-enriched pre-chambered spark plug or an enriched pre-chamber with J-gap spark plug can also be used to ignite the gaseous fuel and air mixture. In other examples, such as dual fuel engines, the gaseous fuel is ignited via compression ignition of a small pilot injection of distillate diesel fuel that propagates a flame front and burns the gaseous fuel and air mixture. While it may be conceivable to produce a compression ignition gaseous fuel engine, no commercially viable compression ignition gaseous fuel engines are known to exist. The use of a gaseous fuel rather than a liquid such as gasoline or diesel presents challenges in regulating the amount of fuel supplied to the engine. For example, it is relatively easier to inject a discrete quantity of liquid fuel directly into an engine cylinder or combustion pre-chamber than to deliver a measured charge of combustible gas, in certain engines. One of the reasons for this fuel metering challenge in gaseous fuel engines relates to the volume and/or pressure changes undergone by gases with changes in temperature.

Nevertheless, gaseous fuel engines can offer significant advantages, one of which is a reduction in certain exhaust gas pollutants. For instance, an internal combustion engine that burns a gas such as methane emits very little, if any unburned hydrocarbon materials or soot. Gaseous fuel internal combustion engines may also be better suited than traditional liquid fuel engines to remote environments where a supply of combustible gas such as natural gas is available, but refined hydrocarbon fuels are cost ineffective or unavailable altogether.

Some pollutants inevitably result from the burning of hydrocarbons as fuel, whether gaseous or liquid. Engineers have devised many ways to reduce certain pollutants in engine emissions over the years. Sophisticated control over fuel injection quantity and timing, fuel additives and catalytic converters all represent attempts to improve the economy and emissions profile of various internal combustion engines.

While substituting gaseous hydrocarbons for liquid hydrocarbons in an internal combustion engine offers inherent advantages, engineers are continually seeking improvements. One class of pollutants of concern is known generically as NOx. NOx refers to several types of nitrogen-oxygen compounds, varying in the number of oxygen atoms bonding with a single nitrogen atom in each molecule.

One attempt to reduce emission of NOx compounds in an internal combustion gasoline engine is known from U.S. Pat. No. 4,173,205 to Toelle. Toelle describes a system wherein a closed loop exhaust gas recirculation system pumps exhaust gas from the engine into the engine intake manifold. The Toelle system is electronically controlled, and utilizes a look-up table having supposed optimal values for manifold air pressure for a given throttle position and engine speed. An electronically controlled valve in the exhaust gas recirculation system is adjusted to provide relatively more or less exhaust gas recirculation flow quantity as needed to reduce NOx emissions. Toelle teaches one attempt to reduce NOx in an internal combustion engine, however, the design is not without its shortcomings, primarily in that manifold air pressure alone represents only an approximate predictor of NOx content in the engine exhaust.

Another known design for limiting NOx production is taught in U.S. Patent Application Publication No. 2004/0024518 to Boley et al. Boley et al. teach a system wherein a density of a combustion mixture entering an engine is adjusted to adjust a NOx output thereof. Boley et al. teach the use of a mass flow sensor or the combination of a pressure and temperature sensor to determine a density of the combustion mixture. Once known, the combustion mixture density can be adjusted to a desired level by increasing fuel flow and/or air flow into the engine. While the Boley et al. design offers certain advantages, the density of the combustion mixture is adjusted only by adjusting the relative proportions of air to fuel in the mix, which may limit the engine to certain operating schemes.

The present disclosure is directed to one or more of the problems or shortcomings set forth above.

SUMMARY

In one aspect, the present disclosure provides a gaseous fuel engine. The engine includes a gaseous fuel supply system and an exhaust gas recirculation system having an adjustable flow which is operable to supply exhaust gas to at least one engine cylinder. The engine further includes means for determining a value indicative of a density of a gas mixture supplied to the engine, and adjusting a flow quantity through the exhaust gas recirculation system based at least in part on the value. A spark plug partially positioned in the at least one engine cylinder.

In another aspect, the present disclosure provides an article that includes a computer readable data storage medium. A gaseous fuel supply system control algorithm is recorded on the data storage medium. A spark plug control algorithm is also recorded on the medium. An exhaust gas control algorithm is recorded on the medium, the algorithm including means for determining a value indicative of a density of a gas mixture in an internal combustion engine. The control algorithm further includes means for setting an engine exhaust gas recirculation flow quantity in the engine based at least in part on the value.

In still another aspect, the present disclosure provides a method of operating a gaseous fuel engine having an exhaust gas recirculation system. Supplying gaseous fuel to at least one engine cylinder. The method includes the step of determining a value indicative of a desired density of a gas mixture supplied to the engine. Spark igniting the gas mixture. The method further includes the step of setting a NOx output of the engine within a predetermined range by setting an exhaust gas recirculation flow quantity based at least in part on the value.

BRIEF DESCRIPTION OF THE DRAWINGS

FIG. 1 is a schematic view of a gaseous fuel internal combustion engine according to the present disclosure;

FIG. 2 is a flow chart illustrating a method of operating an engine according to the present disclosure;

FIG. 3 is a flow chart illustrating a method of tuning an engine according to the present disclosure.

DETAILED DESCRIPTION

Figure 4:
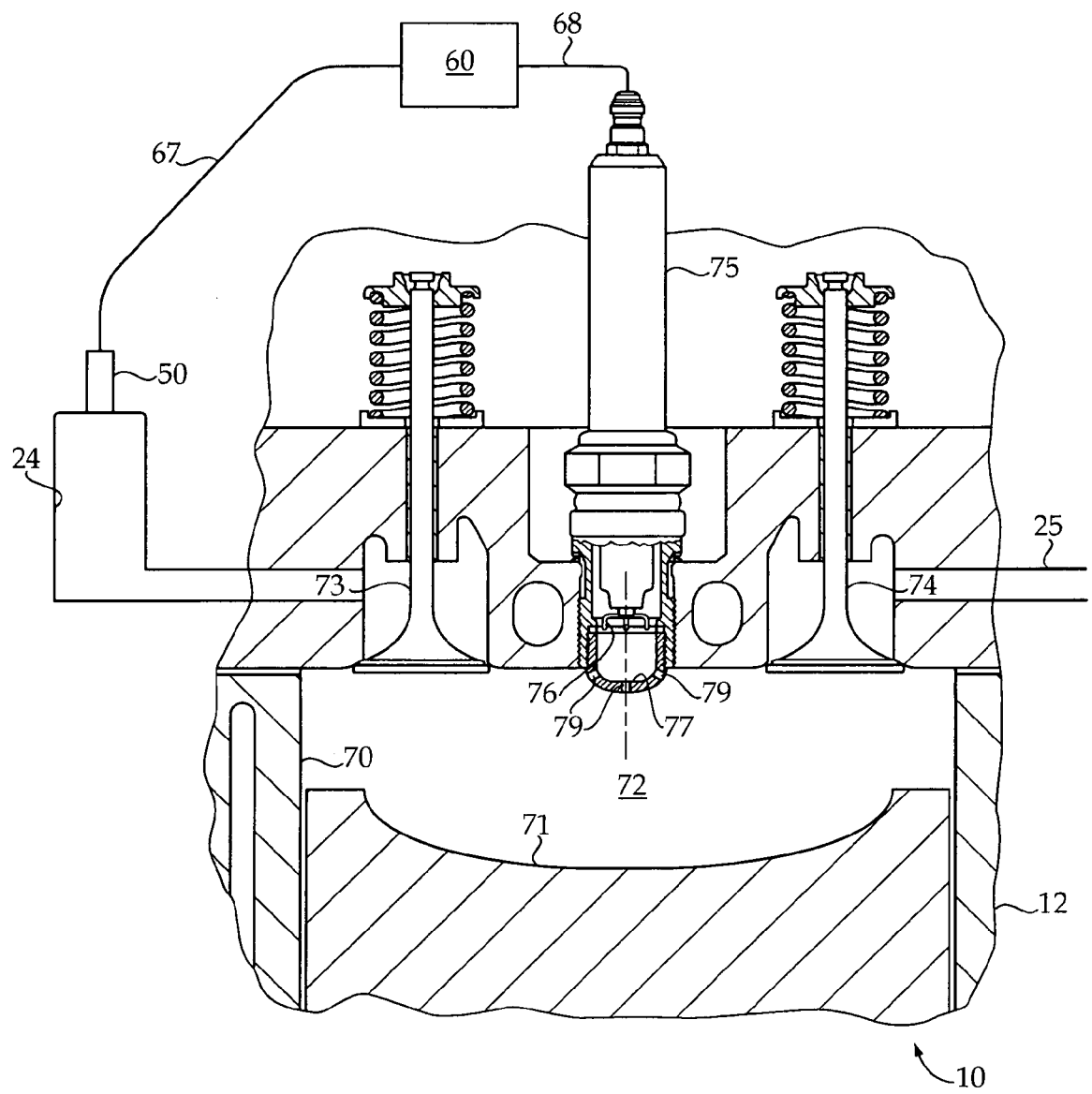
FIG. 4 is a sectioned view of an engine cylinder for the engine shown in FIG. 1.

Referring to FIGS. 1 and 4, there is shown a gaseous fuel internal combustion engine 10. Engine 10 is suited to essentially any application wherein an internal combustion power source is desired, and is particularly well suited to applications wherein it is desirable to limit emissions of certain pollutants, such as NOx compounds. Broadly, engine 10 includes means for determining a value indicative of a density of a gas mixture, for example, a combustion mixture entering an engine housing 12, and means for setting an exhaust gas recirculation flow quantity based at least in part on the determined value. Exhaust gas pumped into the engine intake adjusts a density of the gas mixture toward a desired density. Where gaseous fuel is part of the gas mixture, its density can be described as the "charge density" of the gas mixture or combustion mixture. So long as density of the primary gas quantity entering the engine can be calculated or estimated, a useful "value" can be obtained for setting or adjusting the exhaust gas recirculation flow quantity. In a most preferred embodiment, an actual charge density of a mixture of gaseous fuel, exhaust gas and air is determined, and represented by said value. In other embodiments wherein the object gas mixture contains no fuel, a density or estimated density thereof can be used as the operative value for adjusting or setting exhaust gas recirculation, or the density or estimated density can be used in conjunction with a value or estimated value of later-added fuel pressure. Such an alternative might be an engine in which gaseous fuel is supplied directly to each individual cylinder. Exhaust gas acts as an inert gas heat sink when pumped into the gas mixture, increasing the density thereof, and simultaneously lowering NOx emissions of engine 10.

Thus, depending upon the particular design and operation of engine 10, density measurements or approximations can be made at various points in the intake system of engine 10. For example, where engine 10 utilizes conventional mixing of gaseous fuel, air and exhaust gas upstream an intake manifold, the presently disclosed systems and processes will preferably measure, estimate or approximate the charge density of the entire mixture, as described herein. Where engine 10, for example, utilizes direct injection or port injection, the density of a mixture of only air and exhaust gas might be measured or estimated. Those skilled in the art will appreciate that there is a wide variety of ways to arrive at the described "value," and that numerous engine designs and operating schemes will be well suited to operation, and construction according to the teachings herein.

As used herein, the phrase "value indicative of" should be understood to encompass the characteristic or value of interest directly, e.g. a direct measure of density or charge density, as well as other values having a known relationship with the characteristic or value of interest. "Value" itself should be understood to include a quantity, a code, and/or a signal. Discussions herein of a "signal" should in turn be similarly understood to refer broadly to communication of a variety of sorts between and among the various components of engine 10.

Engine 10 includes an engine housing 12 having at least one cylinder 70 therein, and preferably burns a gaseous hydrocarbon fuel or fuel mixture containing, for example, methane or propane. It should be appreciated that any suitable gaseous fuel might be used. Natural gas containing various proportions of gaseous fuel species is likely to be the gaseous fuel in most applications of the present disclosure.

A gaseous fuel supply system 17 of engine 10 includes a fuel inlet 20 and an air inlet 22 connecting with an engine intake pathway 23. A fuel metering valve 18 is provided and preferably disposed upstream an intake manifold 24 that supplies a combustion mixture to engine housing 12 and the associated at least one cylinder. Intake manifold pressure and temperature sensors 50 communicate intake manifold pressure and temperature to electronic control module 60 via a communication line 67. As described herein, engine 10 may also be a direct or port injection engine, or may include a combustion pre-chamber. A lambda sensor 16, well known in the art, is preferably positioned in an exhaust gas outlet pathway 25, and includes communication means, which may be direct or indirect, with fuel metering valve 18. A conventional three-way catalyst 14 is preferably positioned in exhaust gas outlet pathway 25 to reduce pollutant emissions, as described herein. Other types of catalyst systems, for example, might be substituted for three-way catalyst 14 without departing from the intended spirit and scope of the present disclosure.

Engine 10 further includes an exhaust gas recirculation system or loop 28 that is operable to circulate exhaust gas from outlet pathway 25, preferably to intake pathway 23. In engine 10, exhaust gas is shown as supplied from outlet pathway 25 downstream from catalyst 14. In such an embodiment, a venturi 52 or some other device is preferably incorporated into intake pathway 23 to facilitate delivery of the exhaust gas thereto, preferably upstream from its connection with fuel inlet 20 via a supply line 29. This is the case because a pressure drop in the exhaust gas typically results from its passing through catalyst 14, and some means for assisting in supplying the same to intake pathway 23 is generally desirable. It should be appreciated that exhaust gas might also be taken/pumped from a position upstream from catalyst 14. In such an embodiment, the need for supplemental pumping of exhaust gas is reduced or eliminated, and a venturi is unnecessary, as the pressure of exhaust gas upstream from catalyst 14 will typically be sufficient to recirculate the same. An upstream supply line 28a for this purpose is shown in phantom in FIG. 1. Further, rather than supplying the exhaust gas upstream from the connection of fuel inlet 20 with intake pathway 23, it might be provided, in either of the above embodiments, downstream of fuel inlet 20. A supply line 29a downstream of the connection between intake pathway 23 and fuel inlet 20 is shown in phantom in FIG. 1. Exhaust gas recirculation system 28 further preferably includes an exhaust gas intercooler 40, for example, a conventional heat exchanger, and an adjustable exhaust gas control valve 30.

Referring specifically to FIG. 4, gaseous fuel engine 12 includes a plurality of engine cylinders 70 that each include a reciprocating piston 71, which together define a combustion chamber 72. Those skilled in the art will appreciate that the compression ratio of engine 12 is insufficient to cause compression ignition of gaseous fuel in combustion chamber 72. Instead, each cylinder 70 of engine 12 is equipped with a spark plug 75 that receives control signals from electronic control module 60 via a communication line 68. The result is a spark being formed at spark gap 76 located in a pre-chamber 77. The spark ignited gas mixture in pre-chamber 77 then ignites the remaining mixture of gaseous fuel, air and exhaust gas in combustion chamber 72 via flames projected through flame communication passages 79. Nevertheless, those skilled in the art will appreciate that the present disclosure also contemplates spark ignited gaseous fuel engines that do not include a pre-chamber 77, but instead may utilize a different spark plug configuration, such as a conventional J-gap type spark plug known in the art. Each cylinder 70 is also equipped with a intake valve 73 that receives a mixture of exhaust gas, gaseous fuel and air from intake manifold 24. Likewise, each cylinder 70 includes an exhaust valve 74 for evacuating combustion products from combustion chamber 72 to exhaust outlet passageway 25.

An electronic control module 60, preferably including a programmable microprocessor, is also preferably provided, and is operable to control various of the components of engine 10, as described herein. Control module 60 is preferably in communication with lambda sensor 16 via a communication link 62. Sensor 16 may, for example, be configured to generate periodic signals to control module 60, or control module 60 might itself activate sensor 16 to determine a reading of the exhaust gas. In either case, control module 60 is preferably operable to determine a lambda value, or reciprocal of the fuel to air ratio for the engine. Control module 60 is further preferably operable to adjust a fuel to air ratio of the combustion mixture via a communication link 64 with fuel metering valve 18.

It is generally desirable to operate engine 10 with as close as practicable to stoichiometric quantities of fuel and air in the combustion mixture. At a stoichiometric fuel to air ratio, lambda is equal to one. Accordingly, control module 60 will continually or regularly calculate a lambda value and adjust the fuel to air ratio toward the desired proportions as needed. For example, where the calculated lambda value indicates that the mixture is running too rich, fuel metering valve 18 can be adjusted to reduce the fuel quantity supplied to intake pathway 23. Where the lambda value indicates that the mixture is running too lean, control module 60 can adjust fuel metering valve 18 to increase the quantity of fuel supplied to intake pathway 23. In general, a load on engine 10 can be roughly correlated with the air to fuel ratio. Thus, calculation of the lambda value and adjustment of the fuel to air ratio can be primarily a fine adjustment. In other words, the process can take place at least in part by referencing a pre-recorded map of fuel to air ratios based on various engine load levels with control module 60, which can in turn command relatively fine adjustments in the fuel and/or air supply. Those skilled in the art will appreciate that other suitable means exist for running engine 10 at or close to a stoichiometric air to fuel ratio, and these other means might be employed without departing from the intended scope of the present disclosure.

Control module 60 is further preferably in communication via a communication link 66 with exhaust gas recirculation valve 30, and is operable to adjust the same to vary the flow quantity of exhaust gas from exhaust pathway 25 to intake pathway 23. Thus, a combustion mixture preferably containing air, fuel and a variable level of recirculated exhaust gas is delivered to intake manifold 24. In direct or port injection designs, the mixture will be air plus a variable level of recirculated exhaust gas.

In a preferred embodiment, exhaust gas flow quantity is adjusted based at least in part on a desired density of the gas mixture supplied to engine 10, most preferably based at least in part on the charge density of a mixture of gaseous fuel, air and exhaust gas. Charge density of the mixture has been found to relate to a NOx content of the exhaust gas stream. Thus, the flow quantity of exhaust gas recirculation can be varied to adjust the density of the mixture and correspondingly vary the NOx content of engine exhaust. In general, a higher density results in lower NOx production. However, if the density is too high, for example, where too much exhaust gas is added to the combustion mixture, lean misfire can occur. Likewise, too low a density can result in engine knock. Thus, the exhaust gas recirculation flow quantity is generally adjusted between the engine misfire margin and the engine knock margin to obtain a desired NOx content.

As described herein, control module 60, in cooperation with lambda sensor 16 and fuel metering valve 18, preferably maintains the air to fuel ratio as close as is practicable to stoichiometric quantities. This can take place by adjusting a gaseous fuel quantity supplied to intake pathway 23, or a fuel quantity injected into engine cylinders or pre-chambers. Exhaust gas is pumped into intake pathway 23 to increase the density of the gas mixture entering manifold 24. The relative proportions of fuel and air supplied to engine 10 are preferably generally maintained, however, and the recirculated exhaust gas acts as an inert gaseous heat sink, lowering the combustion temperature. Moreover, because the combustion mixture is preferably maintained relatively close to stoichiometric proportions, three-way catalyst 14 can function with little or no oxygen poisoning from unburned oxygen in the exhaust gas, as might be the case with an engine operating conventionally under lean burn conditions.

The actual density of the gas mixture can be measured, approximated or estimated by any of several means, and is preferably measured by sensing pressure and temperature at intake manifold 24. A form of the ideal gas equation can be utilized to facilitate this calculation, which is as follows:

$$d = \frac{P(MW)}{RT}$$

where:
d=gas mixture density;
P=gas mixture pressure;
T=gas mixture temperature;
R=Ideal Gas Constant.
MW=average molecular weight of the gas mixture Measuring the ratio of pressure to temperature, or the inverse thereof, of the gas mixture at the intake manifold allows a calculation of the density of the gas entering the cylinders of engine housing 12. This capability exists irrespective of the gaseous fuel type. In particular, because "R" is a constant, it represents a known value. Likewise, "MW", or molecular weight relates only to gas reactants and products in an essentially closed system, i.e. fuel, air, and exhaust, having a constant average molecular weight, and also represents a known value. In other words, the average molecular weight of the fuel and air mixture, and exhaust, is equal. Accordingly, a ratio of "P" to "T" can be correlated with and is in fact a value indicative of, a density of the combustion mixture. Because density can be related to NOx output, this calculation can lead to a relatively close predictor of the NOx content of exhaust from engine 10. This offers significantly improved control over a system wherein the pressure alone is used to determine a desired exhaust gas flow quantity.

In a preferred embodiment, once the value indicative of a density of the gas mixture entering engine housing 12 is determined, an exhaust gas quantity recirculated and delivered to intake pathway 23 can be adjusted to adjust the density a desired amount, thereby adjusting the charge density and NOx output of engine 10 accordingly. The desired exhaust gas flow quantity is preferably calculated by control module 60 on the basis of the above considerations.

Preferably, control module 60 includes a computer readable medium having a control algorithm recorded thereon for controlling the aforementioned indicative value determination, and exhaust gas recirculation flow quantity. The algorithm preferably includes means for determining a value indicative of a density of the gas mixture, preferably on the basis of the measured manifold temperature and pressure, and also includes means for setting an exhaust gas recirculation flow quantity based at least in part on the value. The control algorithm may make use of the ideal gas equation in determining this value, although alternative means are contemplated, as described herein. Control module 60 may be further programmed with a second or the same control algorithm having means for determining the fuel to air ratio in engine 10, and for setting the same or adjusting the same toward a desired, e.g. stoichiometric fuel to air ratio. Because engine 10 preferably operates as close as is practicable to stoichiometric fuel and air proportions, gas mixture density adjustment is preferably based at least in part on operation with a lambda value relatively close to 1.

While it has been discovered that charge density and NOx output are related, this relationship is at least partly dependent upon operation at a particular engine speed and load. Accordingly, engine 10 may be equipped with one or more sensors (not shown) that indicate a speed and load thereon. Thus, when calculating and setting a NOx output of engine 10 based on charge density, the selected value depends upon both engine speed and load. Charge density means the density of the gas mixture of fuel, air and recirculated exhaust gas to be combusted in combustion chamber 72. Control module 60 may be configured, for example, via an algorithm recorded thereon, to access a look-up table of plural parameters, including charge density, engine speed and engine load. When the value indicative of density is determined, for example, by measuring pressure and temperature at intake manifold 24, the exhaust gas recirculation flow quantity can be set by comparing this value to prerecorded sets of values in the look-up table for engine speed and load.

Control module 60 may be further configured to set or fine-tune a position of exhaust gas control valve 30, based in part on a position map relating valve position to one or more roughly related engine parameters, for example, engine load alone. A correlation between engine load and desired position of valve 30 can therefore be used as a starting point for subsequent fine adjustments.

Electronic control module 60 may also be configured with a conventional gaseous fuel supply system control algorithm recorded on the medium and executable by a process or associated with electronic control module 60 to control the operation of fuel metering valve 18, and hence the supply of fuel to engine 12. In addition, electronic control module 60 may include a spark plug control algorithm recorded on the medium for controlling the timing and duration of spark events ignition events typically occur when piston 71 is in a vicinity of top dead center of a compression stroke by spark plug 75 to control ignition timing of the gas mixture in engine cylinder 72.

INDUSTRIAL APPLICABILITY

Turning to FIG. 2, there is shown a flow chart setting forth a plurality of steps in a gaseous fuel engine operation process according to the present disclosure. The process of FIG. 2 depicts exemplary steps used in determining and setting a desired exhaust gas recirculation flow quantity in engine 10. Initially, engine 10 will be started, and fuel and air preferably delivered to intake pathway 23 through inlets 20 and 22. The preferred mixture of gaseous fuel and air travels through intake pathway 23 to intake manifold 24, and thenceforth to engine housing 12. Exhaust gas passes through exhaust gas outlet pathway 25 from engine housing 12, and ultimately through three-way catalyst 14 in a conventional manner. As part of engine start-up, or shortly thereafter, lambda sensor 16 preferably measures the unburned oxygen content in exhaust gas pathway 25, and control module 60 can operate fuel metering valve 18 to adjust the fuel to air ratio toward stoichiometric proportions. The gas mixture of fuel, air and recirculated exhaust gas is ignited via a spark initiated at spark gap 76 in pre-chamber 77 at some desired timing, such as when piston 71 is in the vicinity of top dead center. The initial ignition of the gas mixture in pre-chamber 77 is communicated to the remaining gas mixture in combustion chamber 72 via a plurality of flame communication passages 79. If needed, engine 12 might include some known strategy for increasing there relative richness of the gas mixture in pre-chamber 77 for those instances when the air to fuel ratio is relatively high and the gas mixture exhibits greater resistance to ignition and combustion.

Once engine 10 is operating, the engine speed and engine load are preferably determined. As described herein, this may take place with a wide variety of methods, including various sensors. Where engine 10 is used to drive an electrical generator, the engine load may, for example, be determined by monitoring or measuring a load request to the generator itself. Engine speed measurement may take place by any of a wide variety of well-known means. For a given engine speed and load, the NOx content of the exhaust is related to charge density. Therefore, once speed and load are determined, control module 60 will preferably access a look-up table to determine desired charge density at that speed and load that will result in the desired NOx output. Next, control module 60 will preferably determine a value indicative of charge density of the combustion mixture, preferably through the use of pressure and temperature sensors 50 at manifold 24, as described herein. Once the actual charge density, or value indicative thereof has been determined control module 60 will set/adjust valve 30 to obtain the desired charge density of the combustion mixture.

The described speed and load determinations, look-up table access, and setting of the desired charge density value are typically repeated numerous times while engine 10 is operating, often as much as every few milliseconds. Various factors such as ambient temperature, and changes in engine speed and load, etc. can call for re-adjustments in the charge density. The foregoing description is primarily directed to a system having a prerecorded look-up table in control module 60. For a given line of engines, a look-up table may be originally created on a single test engine, then later applied to other engines of similar design, as described herein. For certain applications, or particular engine designs, each individual engine may require its own specific look-up table, populated with data generated by operating the engine under controlled conditions, also described herein.

Thus, control module 60 will determine a desired degree to which combustion mixture charge density should be increased to obtain the desired NOx output of engine 10. This value determines the set point of the valve 30 which adjusts the desired flow quantity of exhaust gas that should be recirculated, between the engine misfire margin and engine knock margin, to obtain the appropriate charge density and corresponding NOx output. Once the desired charge density value has been determined, control module 60 preferably opens or adjusts exhaust gas recirculation valve 30 accordingly. For example, the electronic control module 60 might employ a standard closed loop PID controller to periodically compare the desired charge density with the sensed density, and then modulate valve 30 to adjust the amount of exhaust gas circulation in proportion to the difference between the desired and actual values. As stated earlier, the desired charge density for each engine speed and load could be included in a look-up table of the type well known in the art. Exhaust gas flowing to intake manifold 24 will act as an inert gas heat sink during combustion, increasing pressure and density of the gas mixture in intake manifold 24, and increasing the charge density of the combustion mixture without altering the relative amounts of fuel and air therein, as in certain earlier designs. Accordingly, the NOx output of engine 10 can be reduced, without resulting in excess free oxygen to poison catalyst 14.

Most, if not all, internal combustion engines have manufacturing tolerance differences that affect in minor, but not insignificant ways, the operation of the engine. For certain applications, it may therefore be desirable to populate a look-up table for each individual engine's electronic control module. Alternatively, certain engine designs may be well suited to one standard look-up table applicable to many similar or identical engines. In either case, it is typically desirable to populate a look-up table for engine control when actual NOx emissions, may be measured, for example in a laboratory or at the production facility. This process takes place typically by starting the engine, and running it at a constant speed and load. Once speed and load are determined, NOx sensors or similar devices can be placed in the exhaust stream, and the charge density adjusted by recirculating exhaust gas, to vary the NOx output. NOx output values can then be plotted, and recorded in the look-up table for given charge density, engine speed, and engine load values. The relationship between NOx output and charge density will allow a curve to be fitted to the plotted values.

Although tolerance differences among various engines may confound attempts to accurately set a NOx output based on charge density, the general mathematical relationship there between tends to be applicable across various engine types, engine models and gaseous fuel types. Accordingly, once a function describing the relationship is derived from tests on a single engine, an offset value or multiplier from the function can be calculated for other individual engines. Determination of this offset value can be described as "tuning" each individual engine, based upon data derived from another, similar engine.

Referring to FIG. 3, there is shown a flow chart depicting a process of tuning an engine to allow operation comporting with a known mathematical relationship between charge density and NOx output. Once the engine is started, speed and load are set, and near stoichiometric fuel to air proportions have been achieved, actual engine out NOx content is measured, for example with a NOx sensor. The desired engine out NOx emission level is then compared to actual engine out NOx emission level, and the difference between the two determined. This "difference" can be understood as an offset value or data multiplier corresponding to a deviation in the actual engine performance from a desired engine performance. Once this offset value is known, the prerecorded look-up table may be suitably used with that particular engine, and the look-up table addresses simply adjusted in accordance with the offset value. Thus, a base line look-up table can be generated for a line of engines, and then tuned to each particular engine by comparing the actual NOx output level for that engine at a known speed and load to the desired NOx output based upon the base line numbers. Although the present disclosure recognizes that there appears to be a mathematical relationship between charge density and NOx content of the exhaust, and that this relationship is well suited to a look-up table, those skilled in the art will recognize that a formula, curve fit equations, neural networks or the like could be substituted without departing from the intended scope of the present disclosure.

The present description is for illustrative purposes only, and should not be construed to narrow the scope of the present disclosure in any way. Thus, those skilled in the art will appreciate that various modifications might be made to the presently disclosed embodiments without departing from the intended spirit and scope of the present disclosure. For example, while the presently disclosed embodiments have been described in the context of a system measuring manifold pressure and temperature, other means for determining gas mixture density are contemplated. For example, mass flow sensors for air or fuel might be used to determine density without departing from the scope of the present disclosure. Other aspects, features and advantages will be apparent upon an examination of the attached drawings figures and appended claims.

What is claimed is:
1. A gaseous fuel engine comprising:
a gaseous fuel supply system;
an exhaust gas recirculation system having an adjustable flow, said system being operable to supply exhaust gas to at least one engine cylinder; and
a spark plug partially positioned in the at least one cylinder for igniting a gas mixture;
means for determining a value indicative of a density of the gas mixture, which includes gaseous fuel, air and recirculated exhaust gas, supplied to said engine, and adjusting a flow quantity through said exhaust gas recirculation system based at least in part on said value.
2. The gaseous fuel engine of claim 1 comprising:
an intake manifold;
an exhaust gas outlet pathway;
at least one sensor disposed in at least one of said intake manifold and said outlet pathway; and
a processor configured to communicate with said at least one sensor and operable to determine said value.
3. The gaseous fuel engine of claim 2 wherein:
said at least one sensor includes a pressure sensor and a temperature sensor disposed in said intake manifold;
said processor is configured to communicate with said pressure sensor and said temperature sensor and operable to determine said value based at least in part on a ratio of gas pressure to gas temperature in said manifold, or the inverse of said ratio.
4. The gaseous fuel engine of claim 3 further comprising:
a lambda sensor disposed in said exhaust gas outlet pathway;
a fuel metering valve disposed upstream said intake manifold and coupled with said processor, said fuel metering valve being operable to adjust a fuel flow to said intake manifold and to adjust an actual fuel to air ratio of the engine toward a desired fuel to air ratio;
said processor is configured to communicate with said lambda sensor, and operable to set said exhaust gas recirculation flow quantity based in part on said desired fuel to air ratio.

5. The gaseous fuel engine of claim 4 wherein said processor is operable to set said exhaust gas recirculation flow quantity to adjust a density of the gas mixture independent of a gaseous fuel type.

6. The gaseous fuel engine of claim 1 comprising:
a three-way catalyst disposed in said exhaust gas outlet pathway, said exhaust gas recirculation loop connecting with said exhaust gas outlet pathway downstream said three-way catalyst;
a lambda sensor also disposed in said exhaust gas outlet pathway;
a fuel metering valve operably coupled with said lambda sensor, said fuel metering valve being operable to adjust an actual air to fuel ratio of the engine toward a stoichiometric air to fuel ratio.

7. An article comprising:
a computer readable data storage medium;
a gaseous fuel supply system control algorithm recorded on said medium;
a spark plug control algorithm recorded on said medium;
an exhaust gas control algorithm recorded on said medium, said control algorithm including means for determining a value indicative of a density of a gas mixture, which includes gaseous fuel, air and recirculated exhaust gas, in an internal combustion engine;
said control algorithm further including means for setting an engine exhaust gas recirculation flow quantity in the engine based at least in part on said value.

8. The article of claim 7 wherein said control algorithm includes means for determining said value based at least in part on a pressure and temperature of the gas mixture in an intake manifold of said engine.

9. The article of claim 8 wherein said control algorithm includes means for determining said value based on a ratio of pressure to temperature of a mixture of fuel, air and exhaust gas in said intake manifold or the inverse of said ratio at said intake manifold.

10. The article of claim 9 comprising:
a control algorithm including means for determining a fuel to air ratio in said internal combustion engine and adjusting the same toward a desired fuel to air ratio; and
said control algorithm further including means for setting said exhaust gas recirculation flow quantity based in part on said desired fuel to air ratio.

11. The article of claim 9 wherein said control algorithm includes means for accessing a plural parameter look-up table recorded on said computer readable data storage medium, and calculating and setting an exhaust gas recirculation flow quantity based at least in part on:
a plurality of charge density values in said table;
a plurality of engine speed values in said table; and
a plurality of engine load values in said table.

12. A method of operating a gaseous fuel engine having an exhaust gas recirculation system comprising the steps of:
supplying gaseous fuel to at least one engine cylinder;
spark igniting a mixture of gaseous fuel, air and recirculated exhaust gas;
determining a value indicative of a desired density of a gas mixture, which includes gaseous fuel, air and recirculated exhaust gas, supplied to the engine; and
setting a NOx output of the engine within a predetermined range by setting an exhaust gas recirculation flow quantity based at least in part on said value.

13. The method of claim 12 wherein the step of determining a value includes measuring a temperature and a gas pressure of a mixture containing, air and exhaust gas.

14. The method of claim 13 wherein the step of setting a NOx output of the engine includes referencing a pre-recorded set of NOx values corresponding to a given charge density of a mixture of fuel, air and exhaust gas.

15. The method of claim 14 comprising:
measuring an actual NOx output of the engine at a given speed and load; and
determining an offset value of the actual NOx output relative to the prerecorded set of NOx values.

16. The method of claim 14 wherein the step of setting a NOx output of the engine comprises adjusting a charge density of the engine within a predetermined range between an engine knock charge density and an engine misfire charge density.

17. The method of claim 15 wherein the method comprises the step of measuring a fuel to air ratio of the mixture of fuel, air and exhaust gas and adjusting the same toward a stoichiometric fuel to air ratio.

\* \* \* \* \*